Figure 1:
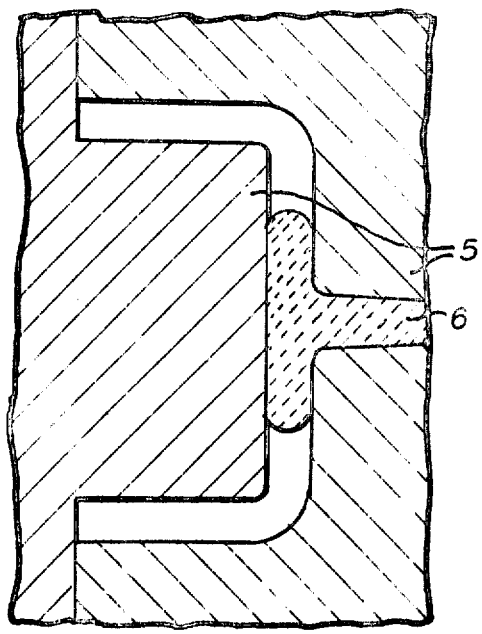

United States Patent
Hanning

[11] 3,894,823
[45] July 15, 1975

[54] APPARATUS FOR INJECTION MOLDING OF PARTS OF SYNTHETIC MATERIAL

[76] Inventor: Robert Hanning, Cavernago Parc 1, Campione d'Italia, Italy

[22] Filed: Oct. 18, 1973

[21] Appl. No.: 407,598

Related U.S. Application Data

[62] Division of Ser. No. 286,733, Sept. 6, 1972, abandoned.

[30] Foreign Application Priority Data
Sept. 7, 1971   Switzerland.................... 13069/71

[52] U.S. Cl.......... 425/130; 264/329; 264/DIG. 83; 264/DIG. 250; 425/DIG. 224; 425/817 R; 425/245 R
[51] Int. Cl........ B28b 13/00; B29c 9/00; B29f 1/12
[58] Field of Search........ 425/244, 245 R, 247, 251, 425/242 R, 817 R, 4, 208, DIG. 224, DIG. 225, 145, 130, 257; 264/228, 229, 250

[56] References Cited
UNITED STATES PATENTS

| | | | |
|---|---|---|---|
| 2,986,776 | 6/1961 | Frohring | 425/245 X |
| 3,339,240 | 8/1967 | Corbett | 425/130 |
| 3,728,056 | 4/1973 | Theysohn | 425/145 X |

FOREIGN PATENTS OR APPLICATIONS

| | | | |
|---|---|---|---|
| 37-6730 | 1962 | Japan | 425/244 |

Primary Examiner—Francis S. Husar
Assistant Examiner—R. J. Charvat
Attorney, Agent, or Firm—Ernest G. Montague; Karl F. Ross; Herbert Dubno

[57] ABSTRACT

An apparatus for the injecting molding of bodies of synthetic resin with an outer material having a smooth surface and a core of porous material. The apparatus comprises an injection nozzle, an injection cylinder, and a inner piston cylinder receiving the core material to constitute an injection piston disposed in the injection cylinder equipped with the injection nozzle and receiving the outer material. A sliding nozzle is carried at the forward end of the porous cylinder. The rear end of the sliding nozzle is equipped with channels and is displaceable into the region of the inside of the piston cylinder containing the core material.

4 Claims, 6 Drawing Figures

APPARATUS FOR INJECTION MOLDING OF PARTS OF SYNTHETIC MATERIAL

The present application is a division of my copending Pat. application Ser. No. 286,733, filed on Sept. 6, 1972 and now abandoned.

The present invention relates to an apparatus for the injection molding of bodies of synthetic resin material, in general, and those with a smooth surface and a porous core, in particular, in which at first the material forming the smooth surface (outer material) and thereafter synthetic resin material containing a foaming agent (core material) is injected into the mold.

Two different apparatus of this type are known. In one type a multi path cock or valve is arranged in a feeding member to the mold, which is switchable to two different injection molding machines, of which one delivers material free from a foaming agent, the other material containing a foaming agent. It is an advantage of this apparatus that two different materials can be used for the peripheral zone and for the core. It a disadvantage that upon switching over of the multi-path valve a stream of the incoming material is torn off and undesirable mixing of both materials can occur in the multi-path valve and the feeding tube.

This drawback is avoided in the apparatus of DOS 1948454. Here by means of an injection nozzle into the material stream in a feeding member in accordance with a predetermined program an expanding agent is injected. The drawback is, that the peripheral zone and the core must consist of the same basic material.

The basic drawback of both devices is that, in particular, in case of complicated bodies, the outer material injected at first is not uniformly pressed against the wall of the mold by the after-flowing core material; it is spread to the extent that it tears, whereby the continuity of the smooth surface layer is interrupted.

It is one object of the present invention to create an apparatus, in which the advantages of the known methods and apparatus are retained, but the drawbacks are avoided. According to the invention complicated bodies can be injection molded with a surface zone and a core of different materials, without mixing of the material for the surface with the material for the core outside of the mold. Furthermore a continuous smooth surface zone is formed.

The present invention is characterized by the fact that at first only part of the outer material is injected into the mold and thereafter the core material and further outer material are simultaneously injection molded. Thus over the entire arrangement it is brought about, that also during injection process the outer material surrounds the core material and during the slow filling of the mold is "rolled out" by the core material as part of a continuous strand.

The apparatus is characterized by the fact, that in an injection cylinder, equipped with an injection nozzle and receiving the outer material, an inner piston cylinder receiving the core material is provided as an injection piston, which piston cylinder carries at its forward end a sliding nozzle, the rear end of which, equipped with channels, is displaceable in the region of the inside of the piston cylinder containing the core material.

The displacement of the sliding nozzle takes place suitably directly by an inner piston, which is axially movably guided in the piston cylinder and can be subjected to any pressure.

The outer material can be selected at will. It must only have a smooth surface and must combine well with the porous core material. If as outer material, more compact thus drive means-free synthetic material, free from an expanding agent and which can also be colored, is to be used, the injection cylinder is connected with a pre-plasticizer device. By this arrangement the compact synthetic material to be injected can be transformed into a melt most favorable for the injection within the apparatus.

A simplification of the device results by constructing the inner piston as a worm piston.

In accordance with a further feature of the present invention, the slide nozzle has a tubular extension, which penetrates in injection-molding position through the injection nozzle up to the mold. By this arrangement a safe separation of the outer material from the core material is possible during the injection process.

A presumption for a correct performance of the individual phases of the projection process and thereby for the production of the part of the synthetic material in the desired quality is a corresponding regulating and control device. In order to cover all factors necessary for regulation and control, pressure measuring devices are provided, in the injection cylinder as well as in the piston cylinder, which devices are connected with the regulating and control device.

Figure 5:
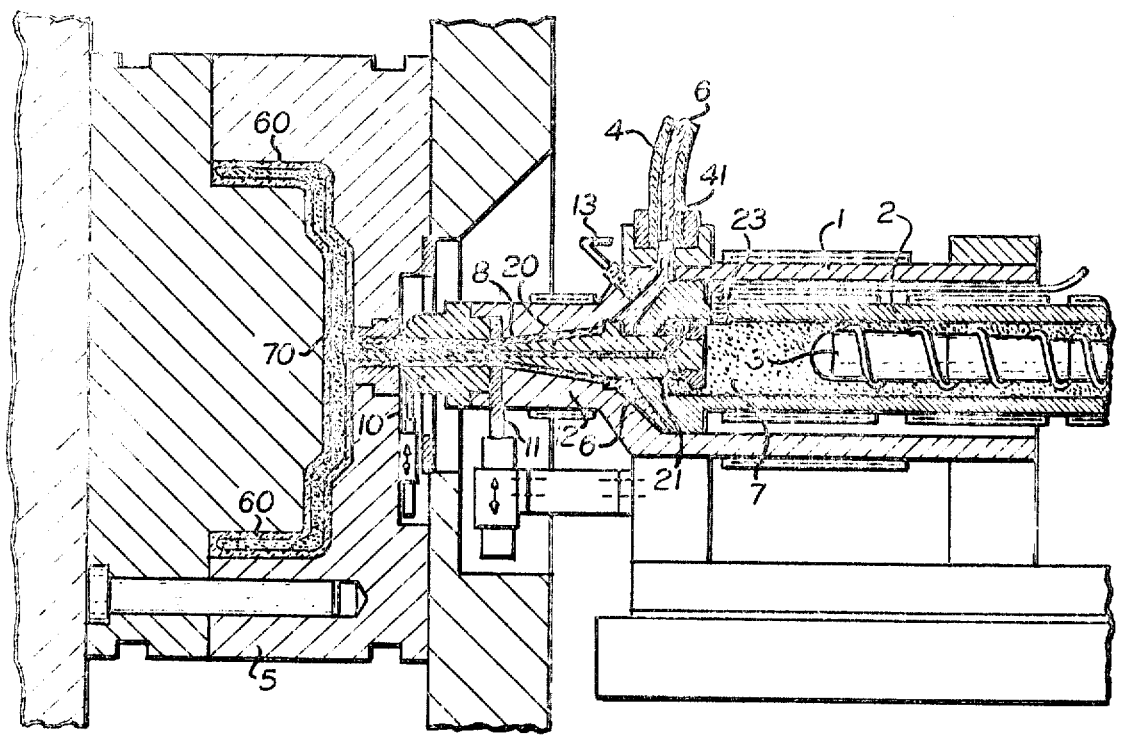
Figure 6:
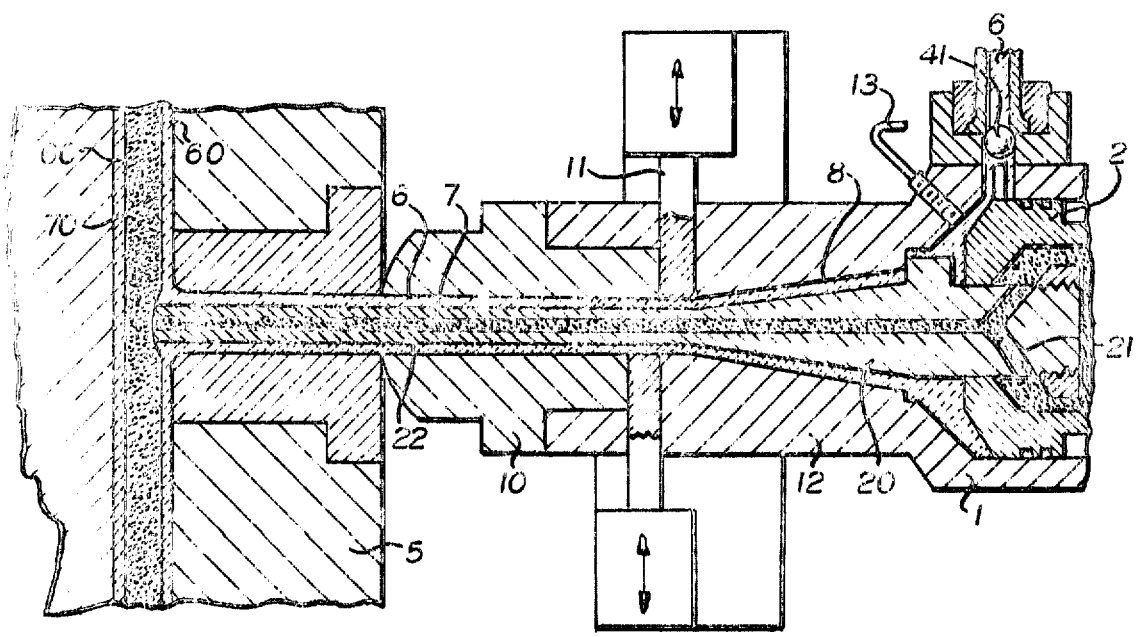

These and other objects will become apparent from the following detailed description with reference to the accompanying drawing, in which:

FIGS. 1 to 4 disclose different phases during the injection molding into a mold;

FIG. 5 is a fragmentary longitudinal section of the suitable device in accordance with the present invention; and FIG. 6 is a longitudinal section at a larger scale of the embodiment with a tubular extended slide nozzle.

Figure 2:
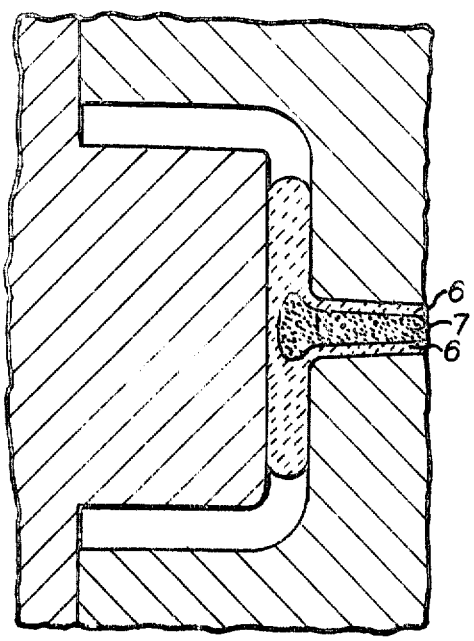
Figure 3:
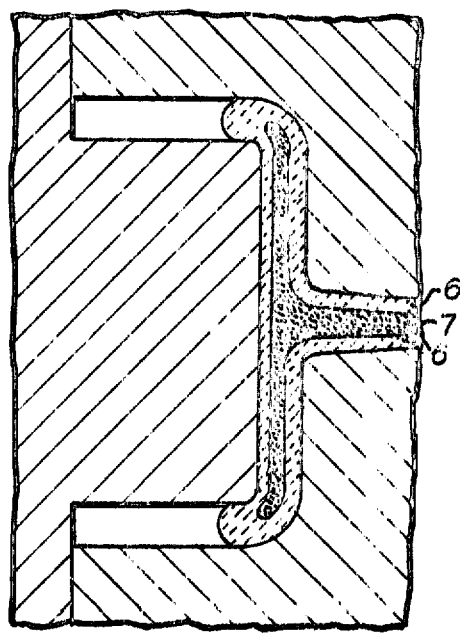
Figure 4:
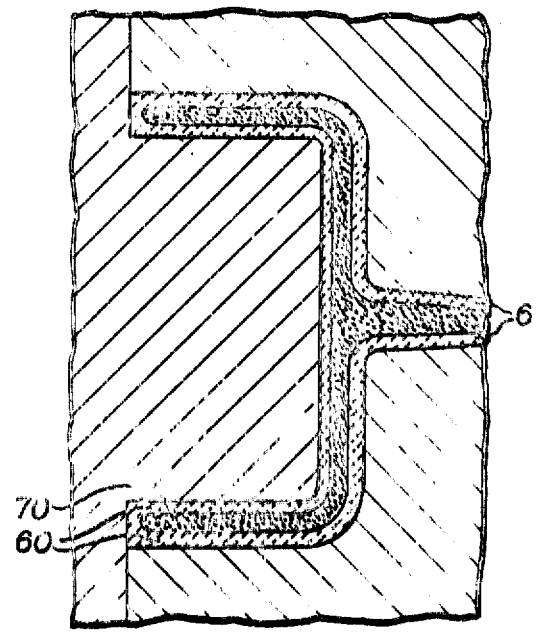

As can be seen from FIGS. 1 to 4, only one part of the outer material 6 necessary for the formation of the edge zone is initially injected, which outer material 6 constitutes in the vicinity of the injection opening of the mold 5 a coherent mass (FIG. 1). Thereafter simultaneously the outer material 6 and core material 7 are injected. The core material 7 drives apart the coherent mass of the already injected outer material 6 and spreads the latter further into the hollow space of the mold; due to the simultaneous feeding of further outer material 6 a tearing off of the still soft material is avoided (FIGS. 2 and 3). If the mold is practically filled, as FIG. 4 shows, the feeding of the core material 7 is interrupted and further outer material 6 is after injected, which displaces the core material from the injection opening. After solidifying, a continuous (uninterrupted) smooth edge layer 60 and a pore containing core 70 is formed.

In both disclosed embodiments of the apparatus (FIGS. 5 and 6) the injection nozzle 10 is connected with the injection cylinder 1, which injection nozzle is mounted in known manner on a frame and is operable in the shown embodiments hydraulically by a slide 11. In the injection cylinder 1 the piston cylinder 2 is slidably disposed, which can be moved forwardly and backwardly by a drive member, (not shown) for example hydraulically. In the forward end of the piston cylinder 2 is mounted the sliding nozzle 20, which is conically shaped at its forward end and projects into the head 12 of the injection cylinder, which has a corresponding recess. In the injection cylinder thus a conically shaped slot 8 is formed for the passage of the outer material 6. The thickness of this stream of outer material 6 depends upon the position of the slide nozzle 20 in relation to the cylinder head 12. In addition to its center bore, the slide nozzle 20 has radially directed channels 21 at its rear end, which depending upon the position of the sliding nozzle bring about a connection with the inside of the piston cylinder 2 and which free the path for the synthetic material 7 containing expanding agent by the sliding nozzle into the mold 5.

In the piston cylinder 2 is guided the inner piston 3, which in the shown embodiments is designed as a worm piston and thus is not only axially movable rather can be also rotated. Not shown is the device known per se for axial- and rotary-movement of the piston 3 and for the feeding of the synthetic material and of the expanding agent.

A conduit 4, through which the outer material 6 reaches the inside of the cylinder 1, is connected to the latter with an intermediate arrangement of a check valve 41 at the forward end of the cylinder 1. The conduit 4 leads to a container (not shown) for the outer material 6 or to a pre-plasticizing device respectively, for a drive means-free synthetic material.

For the determination of the pressure in the cylinder chamber in front of the piston cylinder 2, or in front of the piston 3, respectively, in the cylinder 1 or respectively in the piston cylinder 2, the pressure measuring devices 13 and 23, respectively, are arranged which are connected with the regulating- and control-device (not shown).

The operation or the working procedure, respectively, is described here below, whereby it is assumed, that the surface layer of the part to be produced is a synthetic material free from expanding agent.

During the filling process the mass 6 plasticized in the preplasticizing device is pressed through the conduit 4 via the check valve 41 into the inner space of the injection cylinder 1 by example by means of a worm. By the pressure of the mass 6 prevailing in the cylinder chamber, which pressure is adjustable and which can be measured by the measuring device 13, the piston cylinder 2 is moved backwardly (in the drawing, to the right). This return sliding, can take place by the pressure of the mass directly or indirectly through a servo device as a consequence of impulses transmitted to the control device. If the piston cylinder 2 is returned so far, that the channels 21 of the sliding nozzle 20 are covered up by the forward end wall of the piston cylinder 2, simultaneously with the piston cylinder 2 also the slide nozzle 20 is withdrawn. Now also the plasticizing of the mass forming the core of the form part, the admixture of the mass with the drive means and the filling of the piston cylinder 2 with the drive means containing mass 7 can now start by means of a rotary movement of the worm piston 3, which moves axially back with increasing degree of filling (in the drawing towards the right). The pressure of the mass 7 created thereby, which is measurable and settable by the device 23, must stand at a predetermined ratio to the pressure in the injection cylinder 1. During the injection process, the injection nozzle 10 is opened, by example, hydraulically, by means of the slide 11 and the piston cylinder 2 jointly with the piston 3 is displaced forwardly preferably hydraulically or pneumatically. The slide nozzle 20 remains thereby in the position, in which the channels 21 are covered up. Since at the start of the injection, the slide nozzle 20 assumes a position, which is disposed to the right of the position shown in FIG. 1 at first the conically shaped slide 8 and thereby the passage quantity is less and thereby the dosing is simplified. If the provided part of the outer mass 6 is injected, the position of the slide nozzle 20 has varied relative to the piston cylinder 2 such that the channels 21 lie free and thereby the connection between the inside of the piston cylinder 2 and the form 5 or of the injection nozzle 10, is restored. By the axial forward movement of the piston 3 mass 7 containing expanding agent is injected into the mold 5, while the ibjection of the outer material 6 in the same manner continues with, due to the reduction of the slide 8, a smaller quantity in the time unit.

The control of the different working steps takes place thereby in dependency upon the time, the path and the set and measured pressures of the masses in the cylinders 1 and 2, whereby these factors individually or jointly can be effective.

The embodiment according to FIG. 6 differs merely by the fact that the slide nozzle 20 at the forward end has a tubular-shaped projection 22. The filling of the injection cylinder 1 and of the piston cylinder 2 with the masses 6 and 7 takes place in the same manner as in the embodiment according to FIG. 5. Also the injection of the mass 6 takes place in the same manner. Before the layer of the material determined for the margin is injected, the tubular extension 22 of the slide nozzle 20 is advanced through the bores of the projection nozzle 10, until it reaches, as an injection needle, through the still soft mass 6 with its forward end or to the inside of the mold 5. The control members take care also for the desired method steps. By a corresponding setting of the control and regulating members it is as a matter of course also possible to operate with the described device in accordance with the known method, namely at first to inject the total marginal material and thereafter the total core material.

A particular advantage of the apparatus resides in the fact, that during injection of the drive means containing mass 7 now degasifying occurs, because this mass is surrounded continuously by the marginal material. The outer marginal layer from the mass 6 operates as sealing and prevents thus the escape of the gases or of the drive means, respectively.

I claim:

1. An apparatus for the injection molding of bodies of a synthetic resin with a surface layer of a first material and a core of a second material containing a foaming agent, said apparatus comprising a mold having a mold cavity corresponding to the shape of said body;

an injection nozzle communicating with said mold cavity;

a injection cylinder aligned with and communicating with said nozzle;

a piston cylinder receivable in said injection cylinder and displaceable therein for receiving said second material;

a tubular member slidable in said piston cylinder and extending into said nozzle to define therewith a passage externally of said member for conducting said first material into said mold cavity, said member being provided with channels opening into the interior of said piston cylinder in at least one relative position of said member and said piston cylinder; and a piston axially movably guided in said piston cylinder for displacing said second material therefrom through said member into said mold cavity.

2. The apparatus defined in claim 1 wherein said piston is a worm piston.

3. An apparatus for the injection molding of bodies of a synthetic resin with a surface layer of a first material and a core of a second material containing a foaming agent, said apparatus comprising a mold having a mold cavity corresponding to the shape of said body;

an injection nozzle communicating with said mold cavity;

an injection cylinder aligned with and communicating with said nozzle;

a piston cylinder receivable in said injection cylinder and displaceable therein for receiving said second material;

a tubular member slidable in said piston cylinder and extending into said nozzle to define therewith a passage externally of said member for conducting said first material into said mold cavity, said member being provided with channels opening into the interior of said piston cylinder in at least one relative position of said member and said piston cylinder; and a tubular extension formed of said member and passing through said nozzle in an advanced position of said member whereby an end of said extension lies within said mold cavity.

4. An apparatus for making a synthetic resin body having a continuous surface layer of a first synthetic resin material and a core entirely surrounded by said layer of a second synthetic resin material containing a foaming agent, said apparatus comprising:

a mold having a mold cavity conforming to the shape of said body;

a selectively closeable and openable injection nozzle communicating with said mold cavity;

an injection cylinder communicating at one end with said nozzle and adapted to receive said first material;

a piston cylinder axially displaceable within said injection cylinder and adapted to receive said second material, said piston cylinder being formed at its end turned toward said nozzle with a tubular slide member defining externally thereof an annular passage with said injection nozzle for said first material and defining within said member a central passage for said second material, said member being formed at an end thereof slidably received in said piston cylinder with channels opening into said second passage; and a piston axially displaceable in said piston cylinder.

* * * * *